(12) United States Patent
Chaudhari et al.

(10) Patent No.: US 11,425,402 B2
(45) Date of Patent: Aug. 23, 2022

(54) CROSS-CODEC ENCODING OPTIMIZATIONS FOR VIDEO TRANSCODING

(71) Applicant: Meta Platforms, Inc., Menlo Park, CA (US)

(72) Inventors: Gaurang Chaudhari, San Jose, CA (US); Hariharan G. Lalgudi, Sunnyvale, CA (US); Harikrishna Madadi Reddy, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/238,075

(22) Filed: Apr. 22, 2021

(65) Prior Publication Data

US 2022/0021891 A1  Jan. 20, 2022

Related U.S. Application Data

(60) Provisional application No. 63/069,614, filed on Aug. 24, 2020, provisional application No. 63/054,009, filed on Jul. 20, 2020.

(51) Int. Cl.
*H04N 19/40* (2014.01)
*H04N 19/103* (2014.01)
*H04N 19/117* (2014.01)
*H04N 19/137* (2014.01)

(52) U.S. Cl.
CPC .......... *H04N 19/40* (2014.11); *H04N 19/103* (2014.11); *H04N 19/117* (2014.11); *H04N 19/137* (2014.11)

(58) Field of Classification Search
CPC .... H04N 19/40; H04N 19/103; H04N 19/117; H04N 19/137
See application file for complete search history.

(56) References Cited

U.S. PATENT DOCUMENTS

| 5,253,058 A | * | 10/1993 | Gharavi | H04N 19/30 375/240.12 |
| 9,386,267 B1 | | 7/2016 | Chari | |
| 2009/0196344 A1 | * | 8/2009 | Brown | H04N 19/59 375/240.02 |
| 2014/0241420 A1 | * | 8/2014 | Orton-Jay | H04N 19/176 375/240.03 |
| 2017/0078671 A1 | | 3/2017 | Coward et al. | |

(Continued)

OTHER PUBLICATIONS

Extended European Search Report for European Application No. 21177799.0, dated Sep. 13, 2021, 10 pages.

(Continued)

*Primary Examiner* — Tracy Y. Li
(74) *Attorney, Agent, or Firm* — Van Pelt, Yi & James LLP

(57) ABSTRACT

A method for sharing the motion estimation and mode decision results and decisions of one codec with another codec is disclosed. A video is received to be transcoded into a plurality of different output encodings of a plurality of different codecs. Each codec has a different video encoding format. A shared motion estimation and a shared mode decision processing of the video are performed. One or more results of the shared mode decision processing shared across the plurality of different codecs are used to encode the video into the plurality of different output encodings of the plurality of different codecs.

20 Claims, 5 Drawing Sheets

(56) References Cited

U.S. PATENT DOCUMENTS

2019/0037227 A1 1/2019 Holland et al.
2021/0281867 A1* 9/2021 Golinski .............. H04N 19/172

OTHER PUBLICATIONS

Koziri M.G., et al., "Efficient Cloud Provisioning for Video Transcoding: Review, Open Challenges, and Future Opportunities," IEEE Internet Computing, Institute of Electrical and Electronics Engineers, vol. 22. No. 5, Sep. 1, 2018, pp. 46-55.

* cited by examiner

US 11,425,402 B2

CROSS-CODEC ENCODING OPTIMIZATIONS FOR VIDEO TRANSCODING

CROSS REFERENCE TO OTHER APPLICATIONS

This application claims priority to U.S. Provisional Patent Application No. 63/054,009 entitled CROSS-CODEC ENCODING OPTIMIZATIONS FOR VIDEO TRANSCODING filed Jul. 20, 2020 and U.S. Provisional Patent Application No. 63/069,614 entitled CROSS-CODEC ENCODING OPTIMIZATIONS FOR VIDEO TRANSCODING filed Aug. 24, 2020, both of which are incorporated herein by reference for all purposes.

BACKGROUND OF THE INVENTION

A video coding format is a content representation format for storage or transmission of digital video content (such as m a data file or bitstream). It typically uses a standardized video compression algorithm. Examples of video coding formats include H.262 (MPEG-2 Part 2), MPEG-4 Part 2, H.264 (MPEG-4 Part 10), HEVC (H.265), Theora, Real Video RV40, VP9, and AV1. A video codec is a device or software that provides encoding and decoding for digital video. Most codecs are typically implementations of video coding formats.

Recently, there has been an explosive growth of video usage on the Internet. Some websites (e.g., social media websites or video sharing websites) may have billions of users and each user may upload or download one or more videos each day. When a user uploads a video from a user device onto a website, the website may convert the video from one video coding format to one or more different video coding formats and store the video in the one or more different video coding formats, such that a version of the video that is compatible with or more efficient for a certain set of applications, hardware, platforms, or network conditions may be downloaded to a particular target device. The different video coding formats may provide different output qualities and resolutions. This direct digital-to-digital conversion of one video coding format to another is known as transcoding.

The transcoding of a video includes a number of distinct steps. The first stage of transcoding a video is decoding, in which the video is decompressed from an uploaded file to a number of raw frames. These uncompressed frames are then scaled to change their resolution, and each resolution is encoded again using a set of optimized settings. The output video is also compared with the original to calculate a set of quality metrics. The transcoding steps are typically run in multi-core CPUs in a VOID (video on demand) server. Therefore, improved transcoding techniques would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
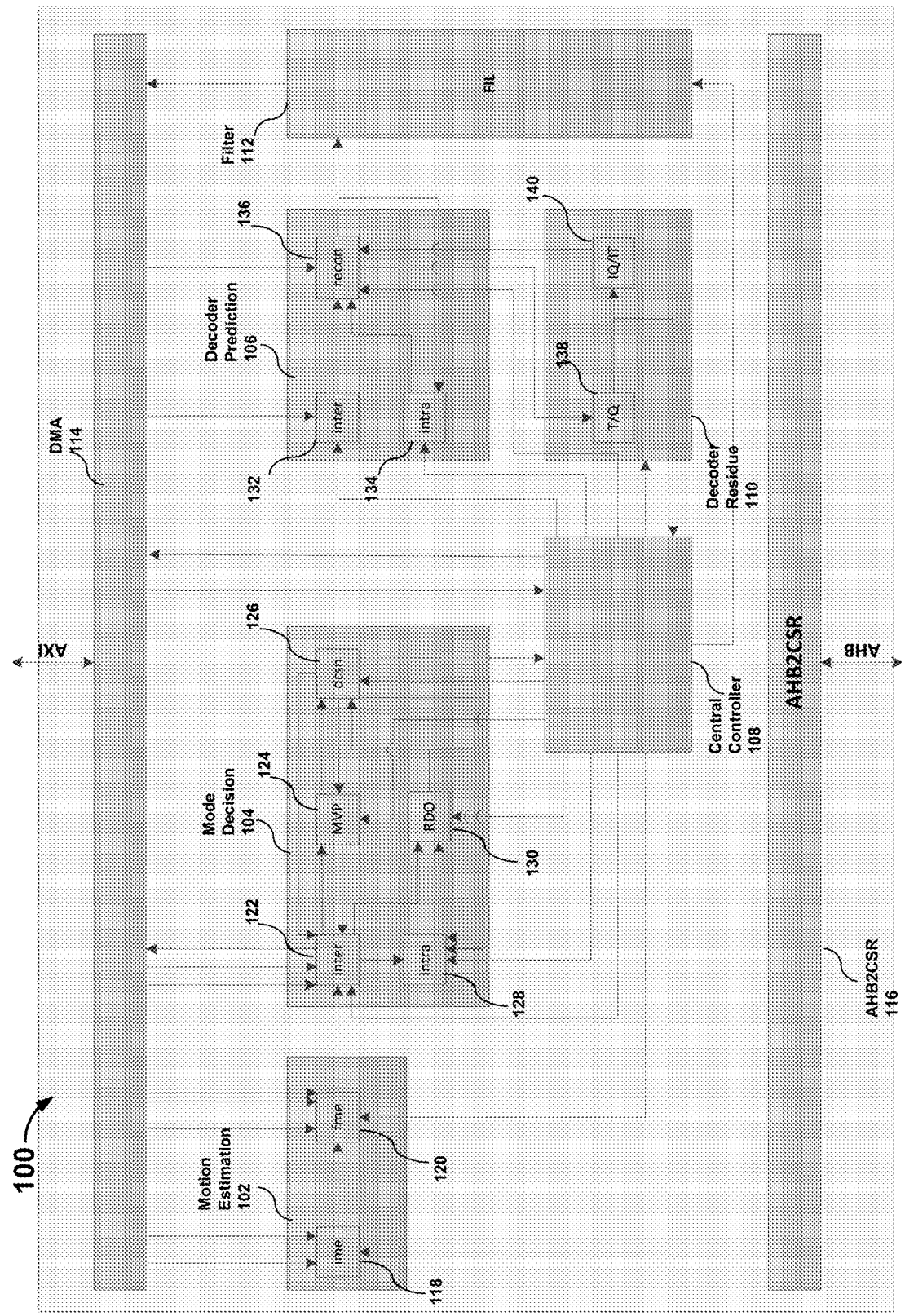
FIG. 1 illustrates a block diagram of an embodiment of a video encoder 100.

FIG. 1 illustrates a block diagram of an embodiment of a video encoder 100. For example, video encoder 100 supports the video coding format AV1 (Alliance for Open Media Video 1). However, video encoder 100 may also support other video coding formats as well, such as H.262 (MPEG-2 Part 2), MPEG-4 Part 2, H.264 (MPEG-4 Part 10), HEVC (H.265), Theora, Real Video RV40, and VP9.

Video encoder 100 includes many modules. Some of the main modules of video encoder 100 are shown in FIG. 1. As shown in FIG. 1, video encoder 100 includes a direct memory access (DMA) controller 114 for transferring video data. Video encoder 100 also includes an AMBA (Advanced Microcontroller Bus Architecture) to CSR (control and status register) module 116. Other main modules include a motion estimation module 102, a mode decision module 104, a decoder prediction module 106, a central controller 108, a decoder residue module 110, and a filter 112.

Video encoder 100 includes a central controller module 108 that controls the different modules of video encoder 100, including motion estimation module 102, mode decision module 104, decoder prediction module 106, decoder residue module 110, filter 112, and DMA controller 114.

Video encoder 100 includes a motion estimation module 102. Motion estimation module 102 includes an integer motion estimation (IME) module 118 and a fractional motion estimation (FME) module 120. Motion estimation module 102 determines motion vectors that describe the transformation from one image to another, for example, from one frame to an adjacent frame. A motion vector is a two-dimensional vector used for inter-frame prediction; it refers the current frame to the reference frame, and its coordinate values provide the coordinate offsets from a location in the current frame to a location in the reference frame. Motion estimation module 102 estimates the best motion vector, which may be used for inter prediction in mode decision module 104. An inter coded frame is divided into blocks known as macroblocks. Instead of directly encoding the raw pixel values for each block, the encoder will try to find a block similar to the one it is encoding on a previously encoded frame, referred to as a reference frame. This process is done by a block matching algorithm. If the encoder succeeds on its search, the block could be encoded by a vector, known as a motion vector, which points to the position of the matching block at the reference frame. The process of motion vector determination is called motion estimation.

Video encoder 100 includes a mode decision module 104. The main components of mode decision module 104 include an inter prediction module 122, an intra prediction module 128, a motion vector prediction module 124, a rate-distortion optimization (RDO) module 130, and a decision module 126. Mode decision module 104 detects one prediction mode among a number of candidate inter prediction modes and intra prediction modes that gives the best results for encoding a block of video.

Intra prediction is the process of deriving the prediction value for the current sample using previously decoded sample values in the same decoded frame. Intra prediction exploits spatial redundancy, i.e., correlation among pixels within one frame, by calculating prediction values through extrapolation from already coded pixels for effective delta coding. Inter prediction is the process of deriving the prediction value for the current frame using previously decoded reference frames. Inter prediction exploits temporal redundancy.

Rate-distortion optimization (RDO) is the optimization of the amount of distortion (loss of video quality) against the amount of data required to encode the video, i.e., the rate. RDO module 130 provides a video quality metric that measures both the deviation from the source material and the bit cost for each possible decision outcome. Both inter prediction and intra prediction have different candidate prediction modes, and inter prediction and intra prediction that are performed under different prediction modes may result in final pixels requiring different rates and having different amounts of distortion and other costs.

For example, different prediction modes may use different block sizes for prediction. In some parts of the image there may be a large region that can all be predicted at the same time (e.g., a still background image), while in other parts there may be some fine details that are changing (e.g., in a talking head) and a smaller block size would be appropriate. Therefore, some video coding formats provide the ability to vary the block size to handle a range of prediction sizes. The decoder decodes each image in units of superblocks (e.g., 128×128 or 64×64 pixel superblocks). Each superblock has a partition that specifies how it is to be encoded. Superblocks may be divided into smaller blocks according to different partitioning patterns. This allows superblocks to be divided into partitions as small as 4×4 pixels.

Besides using different block sizes for prediction, different prediction modes may use different settings in inter prediction and intra prediction. For example, there are different inter prediction modes corresponding to using different reference frames, which have different motion vectors. For intra prediction, the intra prediction modes depend on the neighboring pixels, and AV1 uses eight main directional modes, and each allows a supplementary signal to tune the prediction angle in units of 3°. In VP9, the modes include DC, Vertical, Horizontal, TM (True Motion), Horizontal Up, Left Diagonal, Vertical Right, Vertical Left, Right Diagonal, and Horizontal Down.

RDO module 130 receives the output of inter prediction module 122 corresponding to each of the inter prediction modes and determines their corresponding amounts of distortion and rates, which are sent to decision module 126. Similarly, RDO module 130 receives the output of intra prediction module 128 corresponding to each of the intra prediction modes and determines their corresponding amounts of distortion and rates, which are also sent to decision module 126.

In some embodiments, for each prediction mode, inter prediction module 122 or intra prediction module 128 predicts the pixels, and the residual data (i.e., the differences between the original pixels and the predicted pixels) may be sent to RDO module 130, such that RDO module 130 may determine the corresponding amount of distortion and rate. For example, RDO module 130 may estimate the amounts of distortion and rates corresponding to each prediction mode by estimating the final results after additional processing steps (e.g., applying transforms and quantization) are performed on the outputs of inter prediction module 122 and intra prediction module 128.

Decision module 126 evaluates the cost corresponding to each inter prediction mode and intra prediction mode. The cost is based at least in part on the amount of distortion and the rate associated with the particular prediction mode. In some embodiments, the cost (also referred to as rate distortion cost, or RD Cost) may be a linear combination of the amount of distortion and the rate associated with the particular prediction mode; for example, RD Cost=distortion+ $\lambda$*rate, where $\lambda$ is a Lagrangian multiplier. The rate includes different components, including the coefficient rate, mode rate, partition rate, and token cost/probability. Other additional costs may include the cost of sending a motion vector in the bit stream. Decision module 126 selects the best inter prediction mode that has the lowest overall cost among all the inter prediction modes. In addition, decision module 126 selects the best intra prediction mode that has the lowest overall cost among all the intra prediction modes. Decision module 126 then selects the best prediction mode (intra or inter) that has the lowest overall cost among all the prediction modes. The selected prediction mode is the best mode detected by mode decision module 104.

After the best prediction mode is selected by mode decision module 104, the selected best prediction mode is sent to central controller 108. Central controller 108 controls decoder prediction module 106, decoder residue module 110, and filter 112 to perform a number of steps using the mode selected by mode decision module 104. This generates the inputs to an entropy coder that generates the final bitstream. Decoder prediction module 106 includes an inter prediction module 132, an intra prediction module 134, and a reconstruction module 136. If the selected mode is an inter prediction mode, then the inter prediction module 132 is used to do the inter prediction, whereas if the selected mode is an intra prediction mode, then the intra prediction module 134 is used to do the intra prediction. Decoder residue module 110 includes a transform and quantization module (T/Q) 138 and an inverse quantization and inverse transform module (IQ/IT) 140.

Figure 2:
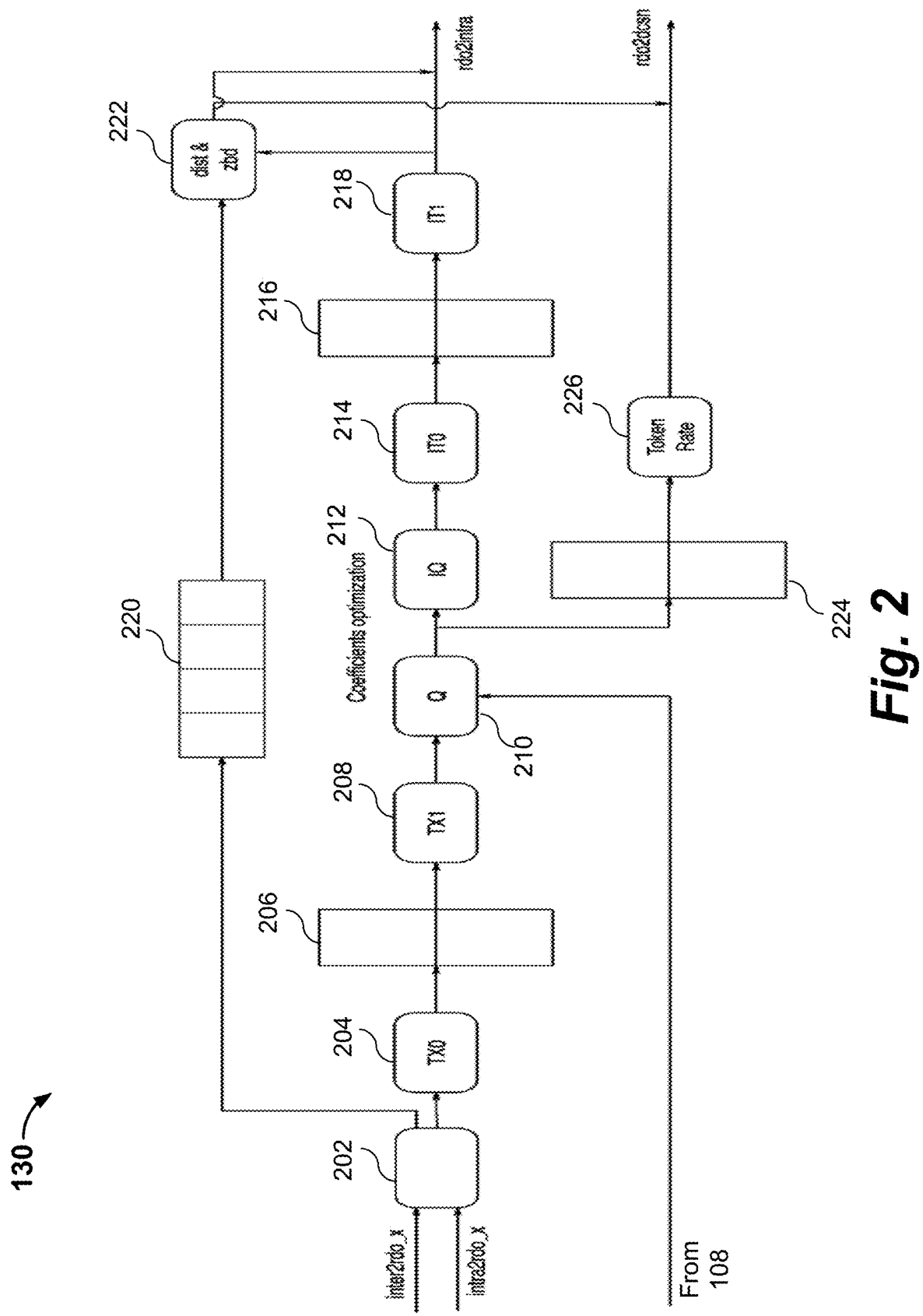
FIG. 2 illustrates an exemplary block diagram of RDO module 130.

FIG. 2 illustrates an exemplary block diagram of RDO module 130. RDO module 130 includes an arbiter and buffer module 202 for receiving inputs from inter prediction module 122 and intra prediction module 128, respectively. The received inputs include the residue data (i.e., the differences between the source/original pixels and the predicted pixels) corresponding to different prediction modes. The residue data is referred to as the original residue, given by original residue=source pixels−predicted pixels. These residues are then transformed using a 2-dimensional transform performed by two stages of transform modules, TX0 module 204 and TX1 module 208, with a transpose operation module 206 in between. After the transform, the transformed values form a transform block, which is a square transform coefficient matrix with a DC coefficient and a plurality of AC coefficients. The transform coefficients are then compressed further by quantizing the coefficients via a quantization module 210.

Distortion may be based on the original residue=source pixels−predicted pixels and the reconstruction residue. For example, one metric is the sum of the squared estimate of errors (SSE), the sum of the squares of the original residue. In order to estimate the amounts of distortion experienced by the decoder, a number of processing steps are performed on the quantized coefficients. Inverse quantization (i.e., dequantization) is performed by a dequantization module 212 and an inverse transform is performed by two stages of inverse transform modules, IT0 module 214 and IT1 module 218, with a transpose operation module 216 in between. The results after the inverse transform are then compared with the original block of residual pixels at the output of a buffer 220 by a distortion estimation module 222, such that the amounts of distortion corresponding to different prediction modes are determined and sent to decision module 126.

The rates associated with sending the data corresponding to a block in a bitstream are also estimated by RDO module 130. One component of the rate is the coefficient rate, which is the rate associated with sending the quantized coefficients in the bitstream. The quantized coefficients at the output of quantization module 210 are sent to a ping-pong buffer 224 and a token rate module 226, where the rate associated with a particular block may be estimated. The rates are estimated by token rate module 226 without performing the actual encoding, because the actual encoding of the bitstream is computationally intensive and requires additional information, e.g., neighbor dependency or other neighbor information, which is not available. Coefficient rate estimation by token rate module 226 is performed for every transform unit (TU) that goes through the RDO process in mode decision module 104. The rate estimation is based on the quantized coefficients.

Because the purpose of the transform is to concentrate the energy in only a few significant coefficients, after quantization, the non-significant transform coefficients are reduced to zeros or near zeros, and therefore the quantized transform coefficient matrix typically has only a non-zero DC coefficient and a small number of non-zero AC coefficients. The end-of-block (EOB) is the location in the matrix where all of the subsequent coefficients are zeros.

The first coefficient is the DC coefficient and its rate is computed based on a function of the coefficient value, the neighbor context, and the token cost. The subsequent AC coefficients are evaluated based on a scan order defined by a scan table that specifies a path through the quantized transform coefficient matrix that is most likely to find all non-zero coefficients while encountering as few zero coefficients as possible. Different modes and different transform types may use a different scan order. The rate of an AC coefficient is computed based on a function of the coefficient value, the neighbor context, and the token cost.

Typically, newer video encoding formats with higher performance and efficiency are periodically introduced to replace current formats. However, widespread adoption of a newer video encoding format usually takes time, for a number of reasons. The computing complexity of a next generation video encoding format may be much higher than an existing format, and therefore existing servers may not have the resources to support the newer codec. For example, the computing complexity of AV1 is significantly higher than VP9; the encoding time of AV1 is estimated to be hundreds of times that of VP9. Edge devices may be slow to adopt the newer video encoding format, and therefore initially there may be very few devices in the networks with the capability to decode the bitstreams. And even when the newer video encoding format is supported, usually the most optimized preset (e.g., for CPU speed) of the newer codec is not used initially. Typically, when a new codec is first being introduced, a preset is selected to make a trade-off between the compute resource capacity/availability and the encoding gain. In other words, a preset of a newer codec is chosen that will give quality gains with a similar compute/power profile of the older (predecessor) codec preset currently deployed in the system. Due to the above reasons, the decision to modify the system to fully support newer codecs in the infrastructure usually takes time. Therefore, improved techniques that can facilitate the deployment of different codecs and reduce computation across codecs would be desirable.

In the present application, a video is received to be transcoded into a plurality of different output encodings of a plurality of different codecs, wherein each codec has a different video encoding format. A shared motion estimation and a shared mode decision processing of the video are performed. One or more results of the shared mode decision processing shared across the plurality of different codecs are used to encode the video into the plurality of different output encodings of the plurality of different codecs.

Figure 3:
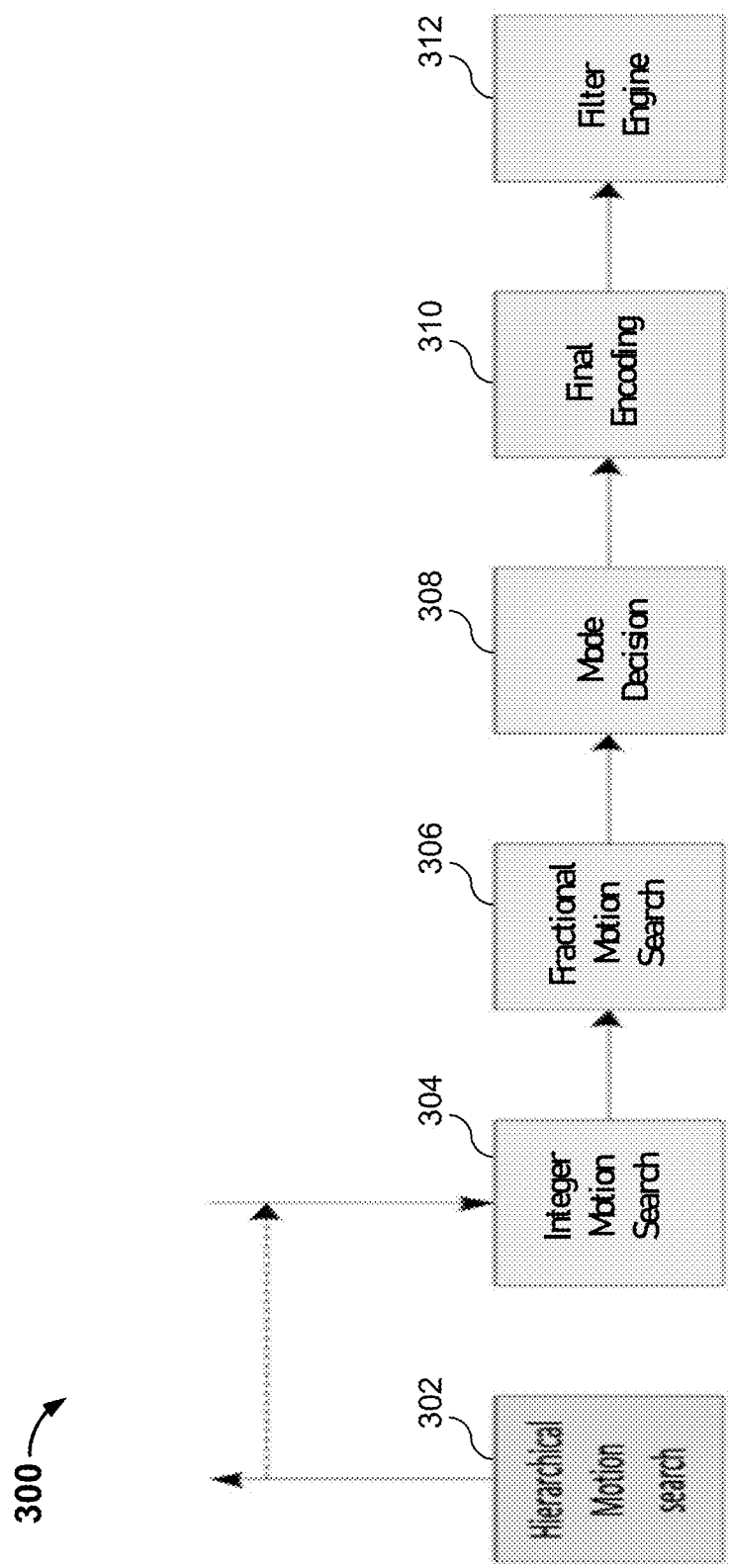
FIG. 3 illustrates a block diagram of an embodiment of a video encoder 300 that supports a particular video encoding format.

FIG. 3 illustrates a block diagram of an embodiment of a video encoder 300 that supports a particular video encoding format. In FIG. 3, the main functional blocks of video encoder 300 are shown. The main blocks include a hierarchical motion estimation block 302, an integer motion estimation block 304, and a fractional motion estimation block 306. These motion estimation blocks perform the process of motion vector determination. The main blocks further include a mode decision block 308. Mode decision block 308 employs rate-distortion optimization to decide the best mode and partition split that give the best results for encoding the superblock of the frame of video. Video encoder 300 further includes a final encoding block 310 that includes sub modules for prediction, transform and quantization, and entropy coding. Final encoding block 310 computes the residue and the transform coefficients for the selected mode and superblock. Final encoding block 310 further performs entropy coding. Another main block in video encoder 300 includes a filter engine 312, e.g., a low pass filter.

Figure 4:
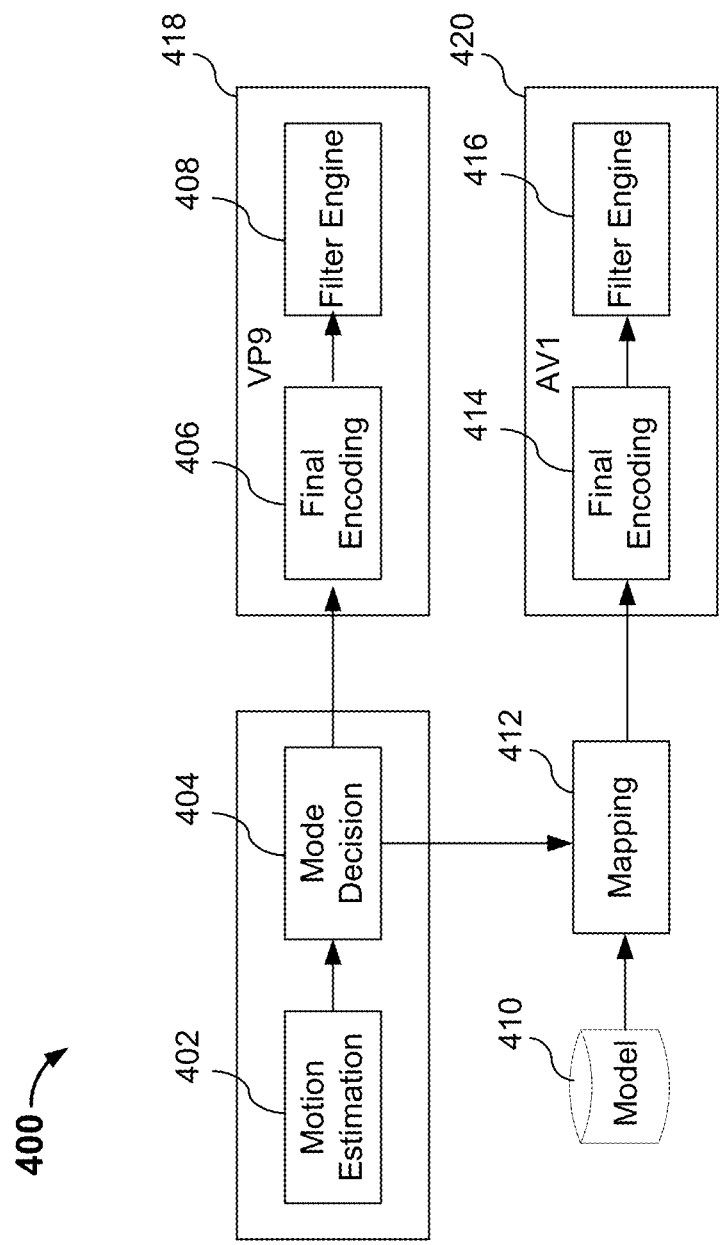
FIG. 4 illustrates a block diagram of an embodiment of a video encoder 400 that supports multiple video encoding formats.

FIG. 4 illustrates a block diagram of an embodiment of a video encoder 400 that supports multiple video encoding formats. Video encoder 400 may be implemented in software or hardware modules, or both. In some embodiments, the results and decisions of motion estimation module 402 and mode decision module 404 for one codec may be shared with another codec, thereby reducing the computational requirements of the system. In some embodiments, the results and decisions of a shared motion estimation module 402 and shared mode decision module 404 are shared across a plurality of codecs. In FIG. 4, the main functional blocks of video encoder 400 are shown. Video encoder 400 includes a common motion estimation block 402 and a common mode decision block 404. Video encoder 400 includes a plurality of standard-specific modules (418 and 420). For example, standard-specific module 418 may be a VP9-specific module 418 that includes a VP9-specific final encoding block 406 and a VP9-specific filter engine 408. VP9-specific final encoding block 406 includes sub modules for prediction, transform and quantization, and entropy coding.

The outputs of mode decision block 404 may be compatible or compliant with one of the standard-specific modules. In the example shown in FIG. 4, the outputs of mode decision block 404 are compliant with VP9. Therefore, the outputs of mode decision block 404 may be directly sent to the VP9-specific module 418 for further processing. The outputs of mode decision block 404 are not compatible with the remaining standard-specific module 420. For example, the outputs of mode decision block 404 may not fully support all the features of standard-specific module 420. In the example shown in FIG. 4, the outputs of mode decision block 404 are not compatible with AV1 or do not fully support all the features and modes for AV1. Therefore, the outputs of mode decision block 404 are not directly sent to the AV1-specific module 420 for further processing. Instead, the outputs of mode decision block 404 are sent to a mapping module 412, such that the outputs of mode decision block 404 may be mapped or augmented to outputs that are compatible with the AV1 standard and may be further processed by the AV1-specific module 420.

In the embodiment shown in FIG. 4, the outputs of mode decision block 404 are mapped to only one other form that is compatible with standard-specific module 420. However, it should be recognized that in some other embodiments, video encoder 400 may include multiple mapping modules 412, each providing a different mapping function for mapping the outputs of mode decision block 404 to outputs that are compatible with a different video encoding format. Each of the mapping modules 412 may be based on a different model stored in a model database 410.

Figure 5:
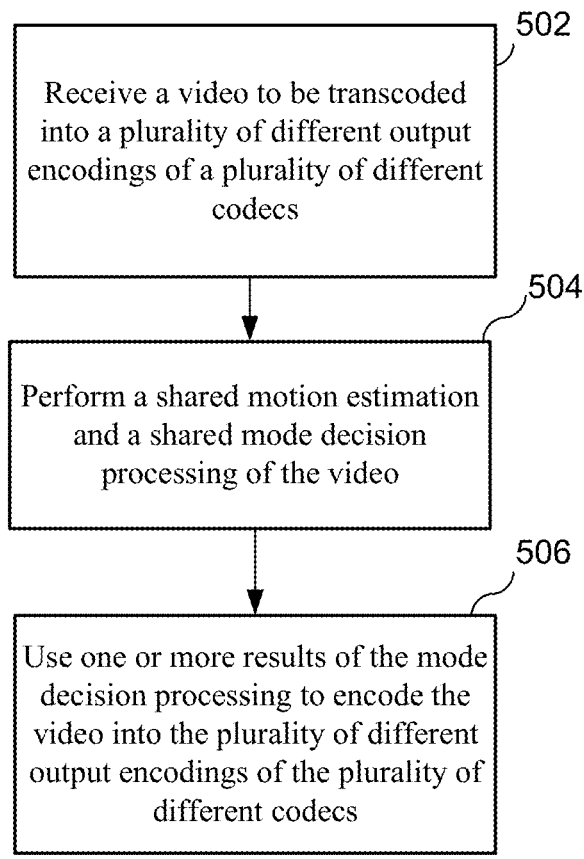
FIG. 5 illustrates an exemplary process 500 for sharing the motion estimation and mode decision results and decisions of one codec with another codec.

FIG. 5 illustrates an exemplary process 500 for sharing the motion estimation and mode decision results and decisions of one codec with another codec. Process 500 may be performed by video encoder 400.

At 502, a video is received to be transcoded into a plurality of different output encodings of a plurality of different codecs. Each codec has a different video encoding format. For example, when a user uploads a video from a user device onto a website, the website may transcode the video from one video coding format to one or more different video coding formats and store the video in the one or more different video coding formats, such that a version of the video that is compatible with or more efficient for a certain set of applications, hardware, platforms, or network conditions may be downloaded to a particular target device. The different video coding formats may provide different output qualities and resolutions. Examples of video coding formats include H.262 (MPEG-2 Part 2), MPEG-4 Part 2, H.264 (MPEG-4 Part 10), HEVC (H.265), VVC (Versatile Video Coding), Theora, Real Video RV40, VP9, and AV1.

At 504, a shared motion estimation and a shared mode decision processing of the video are performed. With reference to FIG. 4, the outputs of motion estimation block 402 and mode decision block 404 are compatible or compliant with one of the standard-specific modules. In the example shown in FIG. 4, the outputs of mode decision block 404 are compliant with VP9. Therefore, the outputs of mode decision block 404 may be directly sent to the VP9-specific module 418 for further processing. VP9-specific module 418 includes a VP9-specific final encoding block 406 and a VP9-specific filter engine 408. VP9-specific final encoding block 406 includes sub modules for prediction, transform and quantization, and entropy coding.

At 506, one or more results of the mode decision processing shared across the plurality of different codecs are used to encode the video into the plurality of different output encodings of the plurality of different codecs. With reference to FIG. 4, the outputs of mode decision block 404 are not compatible with standard-specific module 420. In the example shown in FIG. 4, the outputs of mode decision block 404 are not compatible with AV1. Therefore, the outputs of mode decision block 404 are not directly sent to the AV1-specific module 420 for further processing. Instead, the outputs of mode decision block 404 are sent to a mapping module 412, such that the outputs of mode decision block 404 may be mapped or augmented to outputs that are compatible with the AV1 standard. The mapped results are mode decision results compatible with the AV1 standard. The mapped results are then sent to the AV1-specific module 420 for further processing. AV1-specific module 420 includes an AV1-specific final encoding block 414 and an AV1-specific filter engine 416. AV1-specific final encoding block 414 includes sub modules for prediction, transform and quantization, and entropy coding.

In the embodiment shown in FIG. 4, the outputs of mode decision block 404 are mapped to only one other set of outputs that are compatible with standard-specific module 420. However, it should be recognized that in some other embodiments, video encoder 400 may include multiple mapping modules 412, each providing a different mapping function for mapping the outputs of mode decision block 404 to another set of outputs that is compatible with a different video encoding format. Each of the mapping modules 412 may be based on a different model stored in a model database 410.

In some embodiments, the outputs of mode decision block 404 are mapped from an older video encoding format to a newer video encoding format within the same family of video encoding formats. For example, the outputs of mode decision block 404 are mapped from VP9 to AV1. In another example, the outputs of mode decision block 404 may be mapped from HEVC (High Efficiency Video Coding) to VVC, which is a successor to HEVC. In some embodiments, the outputs of mode decision block 404 are mapped from an older video encoding format to a newer video encoding format across different families of video encoding formats. For example, the outputs of mode decision block 404 may be mapped from VP9 to VVC.

In video encoder 400, the results and decisions of motion estimation module 402 and mode decision module 404 from one codec (also referred to as the main codec) are shared with other codecs (also referred to as the target codecs). In some embodiments, the shared results and decisions satisfy one or more criteria. For example, the shared results and decisions should be computationally intensive. The shared data should conform to the standard (normative) requirements of the target codec directly or through a mapping. The quality of the video output provided by the target codec must be acceptable after reusing the cross-codec data. The extra processing and overhead needed to map the shared data to be used by the target codec is considerably less than generating the motion estimation and mode decision results for the target codec separately.

In some embodiments, a portion of the outputs of mode decision block 404 may be used directly by a target codec if those outputs conform to the standard (normative) requirements of the target codec. Examples of outputs of mode decision block 404 that may be directly used by standard-specific module 420 may include motion vectors, block shapes, block types for inter prediction, block types for intra prediction, or other parameters.

In some embodiments, a portion of the outputs of mode decision block 404 may be mapped by a mapping function to produce corresponding mode decision outputs that are compatible with the target codec. In some embodiments, the mapping function may be one or more lookup tables. In some embodiments, the mapping function may be based on a machine learning model that is learned from the decoder side. For example, final mode types that are selected by VP9 and AV1 may be collected on the decoder side for training a machine learning model, and the machine learning model may be used to map mode decision results from VP9 to AV1.

In some embodiments, a portion of the outputs of mode decision block 404 may be a subset of the full set of mode decision results that are required to fully support all the features and modes for a particular target codec. For example, the target codec may support partition sizes or other intra/inter prediction modes that the main codec does not support. Mapping module 412 may perform additional motion estimation and mode decision processing, and the results of the additional motion estimation and mode decision processing may be integrated with the outputs of mode decision block 404 to form the full set of mode decision results that are required to fully support all the features and modes for a particular target codec.

In some embodiments, a portion of the outputs of mode decision block 404 may be intermediate results of motion estimation or mode decision processing that may be processed by mapping module 412 to form the final set of mode decision results that are required to fully support all the features and modes for a particular target codec. For example, some of the outputs of mode decision block 404 may include RD costs, coefficient rates, mode rates, partition rates, token cost/probability, and the like. The mapping module performs additional motion estimation and mode decision processing based on these intermediate results to form the one or more mapped results. In some embodiments, the intermediate results may include block level statistics that are obtained from pre-processing the video. For example, block level statistics (e.g., statistics of pixel values or coefficient values) may be obtained after the first pass of a two-pass encoding. Two-pass encoding, also known as multi-pass encoding, is a video encoding strategy used to retain the best quality during conversion. In the first pass of a two-pass encoding, the input data from the source clip is analyzed to collect some statistics. In the second pass, the collected data from the first pass is used to make appropriate decisions for selecting encoding parameters for the second pass, thereby achieving the best encoding quality.

In some embodiments, a portion of the outputs of mode decision block 404 may be initial estimated outputs of a mode decision block that is compatible with the target codec. The initial estimated values may be used as initial values for a refinement search for more accurate mode decision results suitable for the target codec. Examples of these outputs of mode decision block 404 may include the final motion vector, block shapes, prediction modes, tuning angular predictions for directional modes, or other parameters.

In some embodiments, whether a particular output of mode decision block 404 is used directly by a target codec or mapped by a mapping function is based on a trade-off between the amount of computation and quality.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a video to be transcoded into a plurality of different output encodings of a plurality of different codecs, wherein each codec has a different video encoding format;
   performing a shared motion estimation and a shared mode decision processing of the video, wherein the shared motion estimation and the shared mode decision processing are compatible with a first codec of the plurality of different codecs with a first video encoding format, and wherein the shared motion estimation and the shared mode decision processing are not compatible with a second codec of the plurality of different codecs with a second video encoding format; and
   using one or more results of the shared mode decision processing shared across the plurality of different codecs to encode the video into the plurality of different output encodings of the plurality of different codecs, comprising:
   directly sending a result of the shared mode decision processing to a first standard-specific module compatible with the first video encoding format for further processing, wherein the result of the shared mode decision processing comprises a mode decision processing result compatible with the first video encoding format;
   sending the result of the shared mode decision processing to a mapping module that maps the result to a mapped result, wherein the mapped result comprises a mode decision processing result compatible with the second video encoding format; and
   sending the mapped result to a second standard-specific module compatible with the second video encoding format for further processing.

2. The method of claim 1, wherein the first standard-specific module comprises a first standard-specific final encoding module and a first standard-specific filter engine.

3. The method of claim 2, wherein the first standard-specific final encoding module performs prediction, transform and quantization, and entropy coding.

4. The method of claim 1, wherein the second standard-specific module comprises a second standard-specific final encoding module and a second standard-specific filter engine.

5. The method of claim 4, wherein the second standard-specific final encoding module performs prediction, transform and quantization, and entropy coding.

6. The method of claim 1, wherein the mapping module maps the result to the mapped results using a mapping function based on a machine learning model, wherein the machine learning model is trained based on mode decisions collected on one or more video decoders.

7. The method of claim 1, further comprising sending a second result of the shared mode decision processing to the mapping module, wherein the mapping module performs additional motion estimation and mode decision processing, wherein the mapping module outputs a corresponding mapped result based on the second result of the shared mode decision processing and results of the additional motion estimation and mode decision processing.

8. The method of claim 1, further comprising sending a third result of the shared mode decision processing to the mapping module, wherein the third result of the shared mode decision processing comprises an intermediate results of motion estimation or mode decision processing, and wherein the mapping module performs additional motion estimation and mode decision processing based on the intermediate result to form a corresponding mapped result.

9. The method of claim 1, further comprising sending a fourth result of the shared mode decision processing to the mapping module, wherein the mapping module uses the fourth result as an initial value for a refinement search for a refined mode decision processing results to form a corresponding mapped result.

10. The system of claim 1, wherein the processor is configured to process the mapped results using a second standard-specific final encoding module and a second standard-specific filter engine, wherein the second standard-specific final encoding module performs prediction, transform and quantization, and entropy coding.

11. The system of claim 1, wherein the processor is configured to map the result to the mapped results using a mapping function based on a machine learning model, wherein the machine learning model is trained based on mode decisions collected on one or more video decoders.

12. The system of claim 1, wherein the processor is configured to send a second result of the shared mode decision processing to the mapping module, wherein the mapping module performs additional motion estimation and mode decision processing, and wherein the mapping module outputs a corresponding mapped result based on the second result of the shared mode decision processing and results of the additional motion estimation and mode decision processing.

13. The system of claim 1, wherein the processor is configured to send a third result of the shared mode decision processing to the mapping module, wherein the third result of the shared mode decision processing comprises an intermediate results of motion estimation or mode decision processing, and wherein the mapping module performs additional motion estimation and mode decision processing based on the intermediate results to form a corresponding mapped result.

14. The system of claim 1, wherein the processor is configured to send a fourth result of the shared mode decision processing to the mapping module, wherein the mapping module uses the fourth result as an initial values for a refinement search for a refined mode decision processing results to form a corresponding mapped result.

15. The method of claim 1, wherein the result comprises a best mode and partition split decided by the shared mode decision processing for encoding the video, wherein the decided best mode and decided partition split are compatible with the first video encoding format.

16. The method of claim 15, wherein the mapped result comprises a mapped best mode and a mapped partition split for encoding the video, wherein the mapped best mode and the mapped partition split are compatible with the second video encoding format.

17. A system, comprising:
an interface configured to receive a video to be transcoded into a plurality of different output encodings of a plurality of different codecs, wherein each codec has a different video encoding format; and
a processor coupled to the interface and configured to:
perform a shared motion estimation and a shared mode decision processing of the video, wherein the shared motion estimation and the shared mode decision processing are compatible with a first codec of the plurality of different codecs with a first video encoding format, and wherein the shared motion estimation and the shared mode decision processing are not compatible with a second codec of the plurality of different codecs with a second video encoding format; and
use one or more results of the shared mode decision processing shared across the plurality of different codecs to encode the video into the plurality of different output encodings of the plurality of different codecs, comprising:
directly sending a result of the shared mode decision processing to a first standard-specific module compatible with the first video encoding format for further processing, wherein the result of the shared mode decision processing comprises a mode decision processing result compatible with the first video encoding format;
sending the result of the shared mode decision processing to a mapping module that maps the result to a mapped result, wherein the mapped result comprises a mode decision processing result compatible with the second video encoding format; and
sending the mapped result to a second standard-specific module compatible with the second video encoding format for further processing.

18. The system of claim 17, wherein the result comprises a best mode and partition split decided by the shared mode decision processing for encoding the video, wherein the decided best mode and decided partition split are compatible with the first video encoding format.

19. The system of claim 18, wherein the mapped result comprises a mapped best mode and a mapped partition split for encoding the video, wherein the mapped best mode and the mapped partition split are compatible with the second video encoding format.

20. A system, comprising:
an interface receiving a video to be transcoded into a plurality of different output encodings of a plurality of different codecs, wherein each codec has a different video encoding format;
a motion estimation module configured to perform a shared motion estimation of the video;
a mode decision module configured to:
perform a shared mode decision processing of the video, wherein the shared mode decision processing is compatible with a first codec of the plurality of different codecs with a first video encoding format, and wherein the shared mode decision processing is not compatible with a second codec of the plurality of different codecs with a second video encoding format;

directly send a result of the shared mode decision processing to a first standard-specific module compatible with the first video encoding format for further processing, wherein the result of the shared mode decision processing comprises a mode decision processing result compatible with the first video encoding format; and a mapping module configured to use one or more results of the shared mode decision processing shared across the plurality of different codecs to encode the video into the plurality of different output encodings of the plurality of different codecs, comprising:

receiving the result of the shared mode decision processing from the shared mode decision processing, and mapping the result to a mapped result, wherein the mapped result comprises a mode decision processing result compatible with the second video encoding format; and sending the mapped result to a second standard-specific module compatible with the second video encoding format for further processing.

* * * * *